Jan. 31, 1961 W. LASAR 2,969,815
BAND SAW MOUNTING FOR A MEAT CUTTING SAW
Filed April 3, 1959 2 Sheets-Sheet 1

INVENTOR.
WILLIAM LASAR
BY Fulwider Mattingly & Huntley
Attorneys

Jan. 31, 1961 W. LASAR 2,969,815
BAND SAW MOUNTING FOR A MEAT CUTTING SAW
Filed April 3, 1959 2 Sheets-Sheet 2

INVENTOR.
WILLIAM LASAR
BY Fulwider Mattingly & Huntley
Attorneys

United States Patent Office 2,969,815
Patented Jan. 31, 1961

2,969,815

BAND SAW MOUNTING FOR A MEAT CUTTING SAW

William Lasar, Downey, Calif.
(2540 E. 114th St., Los Angeles 2, Calif.)

Filed Apr. 3, 1959, Ser. No. 804,005

1 Claim. (Cl. 143—27)

The present invention relates to meat cutting machines of the band saw type and more particularly to a novel and improved arrangement for mounting the band saw of such machine.

It is a major object of the present invention to provide an arrangement for mounting a band saw in a meat cutting machine of the type shown in U.S. Patent No. 2,380,700, issued to me July 31, 1945. Such machine utilizes an electric motor-driven band saw carried between upper and lower pulleys. Although the band saws utilized in such machines are designated as being of a predetermined size, the actual size of the band may vary in length so as to be shorter or longer than the size number by which it is designated. Accordingly, it is necessary to provide means in the meat cutting machine to compensate for such length variations. The present invention has as one of its objects the provision of saw band tightening means which accommodates bands of all different sizes and is readily adjustable to apply proper operating tension to such bands.

It is necessary to remove the saw band from meat cutting machines of the aforedescribed nature at periodic intervals for cleaning. Additionally, it sometimes occurs that the saw band is not accurately adjusted relative to its supporting pulleys and it will therefore slip off one of the pulleys. When this occurs the saw band must, of course, be again positioned upon its supporting pulleys. With heretofore-proposed meat cutting machines of this nature, it has been necessary to readjust the tension of the saw band each time the band was removed from and replaced upon its supporting pulleys.

It is a particular object of the present invention to provide mounting means for a saw band which permits the saw band to be readily removed and replaced upon its supporting pulleys and without requiring a readjustment of the tension adjustment of the saw band.

A further object of the present invention is to provide a band saw mounting of the aforedescribed nature which is simple in design and rugged of construction whereby it may afford a long and trouble-free service life.

Yet another object of the present invention is to provide a saw band mounting of the aforedescribed nature which incorporates positive marking means for indicating that the saw band has been properly tensioned.

These and other objects and advantages of the present invention will become more apparent from the following detailed description, when taken in conjunction with the appended drawings, wherein.

Figure 1:
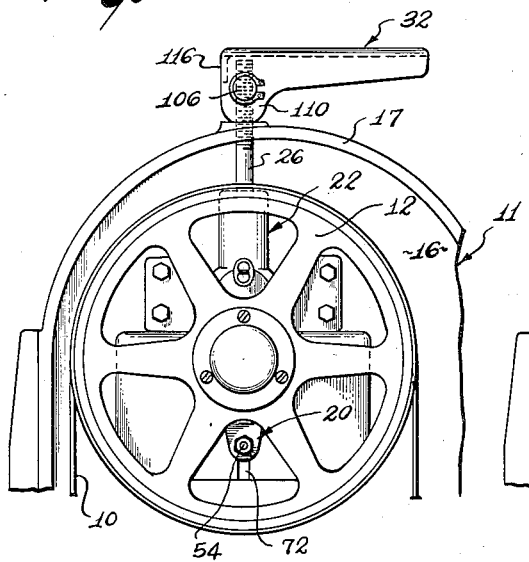
Figure 1 is a front elevational view of a preferred form of band saw mounting embodying the present invention.

Referring to the drawings and particularly Figure 1 thereof, the preferred form of band saw mounting embodying the present invention is utilized in conjunction with an endless saw band 10. This saw band 10 is supported between the upper and lower pulleys of a meat cutting machine. In the appended drawings only the upper pulley housing 11 of such machine is disclosed. The lower pulley, as well as the remainder of the meat cutting machine whereon the saw band 10 is mounted do not appear in the drawings, but the construction thereof may be taken as similar to that shown in the aforementioned Patent No. 2,380,700. The upper pulley housing 11 encloses an upper pulley 12 of conventional construction. The upper pulley housing 11 is of cast metallic construction and includes a back wall 16, a forwardly extending top wall 17 and a bottom wall 18. A cover 19 is hingedly secured to one side of the housing 11 so as to permit access to the interior thereof. The cover 19 corresponds generally in shape to the profile of the rear wall 16.

The mounting arrangement for the saw band 10 broadly includes a yoke, generally designated 20 vertically slidably connected to the upper pulley housing 11 and carrying the upper pulley 12, a hanger member generally designated 22, which supports the yoke member 20, and an upstanding tension rod 26 interposed between the hanger member 22 and the upper pulley housing 11. The lower portion of the tension rod 26 carries a tension indicator, generally designated 28, and spring means 30 are interposed between the tension indicator and the hanger member 22 opposing the tension applied by the tension rod 26 to the saw band 10. The upper end of the tension rod 26 is secured to an adjustable handle, generally designated 32, which is utilized to control the amount of tension exerted by the tension rod 26 upon the saw band 10. This adjustment handle 32 also serves as a quick release means for the saw band when the latter is to be removed from the upper pulley 12 in a manner to be fully set forth hereinafter.

More particularly, the upper pulley 12 is keyed to a horizontal shaft 40 rotatably carried by suitable ball bearings 41 disposed within a generally cylindrical bearing case 42. Access to the interior of this bearing case 42 is provided by removing front and rear retainer rings 43 secured to the case by means of a plurality of cap screws 44. The bearing case 42 forms the intermediate part of the integral yoke member 20. This yoke member also includes a pair of spaced upwardly extending arms 48 and 50 and a depending arm or finger 52. The lower portion of the finger 52 carries a round point adjusting screw 54. The yoke member 20 is hung from a horizontal pin 56 which projects through aligned bores 58 and 59 formed in the upper portion of the arms 48 and 50. The ends of the pin 56 project into vertical guide channels 60 and 62 formed in the proximate vertical edges of a pair of support ribs 64 and 66, respectively. The support ribs 64 and 66 project forwardly from the rear wall 16 and are integral therewith. The front faces of the support ribs 64 and 66 receive a pair of generally rectangular keeper plates 67 and 68, respectively. The latter are secured to the support ribs by means of cap screws 69. The proximate vertical edges of the keeper plates coincide with those of the support ribs 64 and 66 whereby these plates restrain the ends of the horizontal pin 56 within the aforementioned guide channels 60 and 62, as will be clear by reference to Figure 6 and also Figure 3. In the latter figure the keeper plate 68 has been shown cut away in the interest of clarity. The rear wall 16 of the upper pulley housing 11 is centrally formed with a vertically extending groove 72 that slidably receives the rear end of the round point adjusting screw 54.

Figure 3:
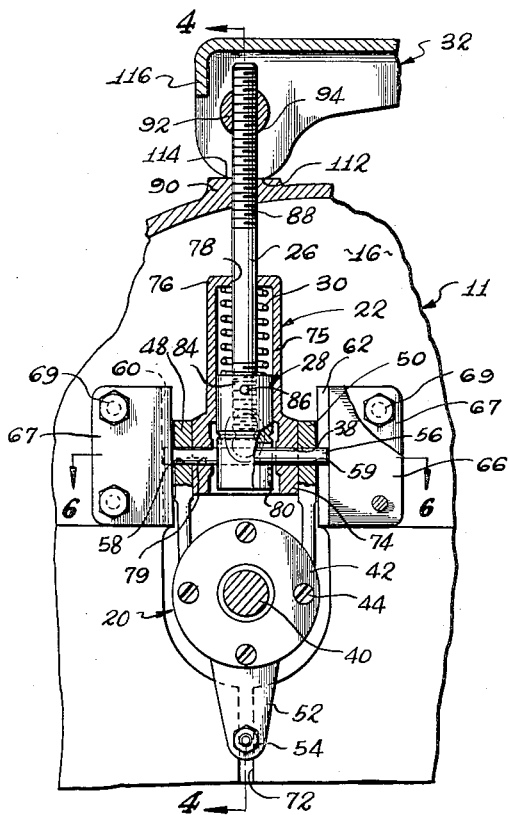
Figure 3 is a fragmentary, partly sectional, front elevational view, taken in enlarged scale as compared to Figure 1.
Figure 6:
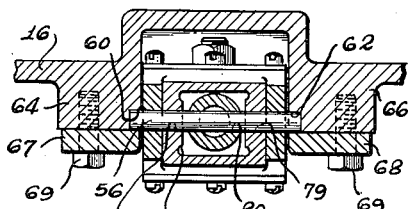
Figure 6 is a horizontal sectional view taken along line 6—6 of Figure 3.

The intermediate portion of the horizontal pin 56 inwardly of the yoke arms 48 and 50 is surrounded by a skirt 74 formed at the lower portion of the hanger member 22. This skirt 74 is generally rectangular when viewed in horizontal section, as shown in Figure 6. The upper portion of the skirt 74 integrally merges into the lower end of an upstanding spring tube 75. The tube 75 is provided with an integral upper wall 76 formed with a coaxial bore 78. As indicated in Figures 3 and 6, the side walls of the skirt 74 are formed with a pair of horizontally aligned bores 79 through which extend the outer portions of the horizontal pin 56.

The lower portion of the spring tube 75 and the skirt 74 vertically slidable receives the tension indicator 28, the latter taking the form of a cylindrical body. The lower portion of this body 28 is formed with vertically extending slots 80 through which extends the intermediate portion of the aforementioned horizontal pin 56. Above the slots 80 the indicator body is formed with an annular marking groove 82. The indicator body 28 is also coaxially formed with a vertically extending internally threaded bore 84. This bore 84 threadably receives the externally threaded lower end of the tension rod 26. A pin 86 likewise keys the indicator body 28 to the lower portion of the tension rod 26. With this arrangement, should the pin 86 undergo inadvertent rupture the indicator body 28 will still remain fixed against vertical movement relative to the tension rod. The aforementioned spring means 30 consists of a coil compression spring which is interposed between the upwardly-facing top surface of the indicator body 28 and the underside of the top wall 76 of the spring tube.

The upper portion of the tension rod 26 extends through a vertically extending bore 88 formed in the top wall 17 of the upper pulley housing 11. As indicated particularly in Figures 3 and 4, the top wall 18 is formed with an upwardly extending boss 90 that surrounds the bore 88. The adjustment handle 32 includes a horizontally extending nut element 92 of cylindrical configuration. This nut element 92 is formed with an internally threaded vertically extending bore 94 that receives the externally threaded upper portion of the tension rod 26. The adjustment handle 32 also includes a pair of elongated side walls 96 and 98 (Figure 4) and an integral top wall 100 that bridges the upper portions of the side walls. The ends of the nut element 92 extend between and are rotatable relative to a pair of aligned horizontal bores 102 and 104 formed in the front portions of the side walls 96 and 98 respectively. The nut element 92 is secured against movement along its longitudinal axis relative to the side walls by means of conventional retainers 106. The side walls of the adjustment handle 32 are formed below the nut element 92 with depending arcuate cam surfaces 108 and 110, respectively. These cam surfaces 108 and 110 of the two side walls are identical in configuration and when the adjustment handle is disposed in its normal horizontal position of Figures 1 and 3, a pair of flats 112 formed at the bottom of the cam surfaces will rest upon the upwardly-facing horizontal surface 114 of the boss 90. The front edge of the adjustment handle 32 is formed with a flat surface 116, and as will be apparent by reference to Figure 2, the adjustment handle may be pivoted upwardly in a counterclockwise direction relative to its position of Figures 1, 3 and 4 to the upstanding position shown in Figure 2. At this time the flat surface 116 will rest upon the upwardly facing surface 114 of the boss 90.

Figure 5:
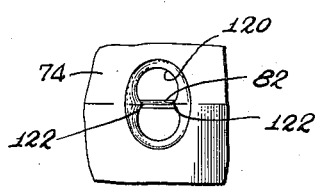
Figure 5 (Sheet 1) is a fragmentary view in enlarged scale showing an indicator member of said mounting.

The compressional deflection of the spring 30 is a measure of the load applied to the hanger member 22 and thus to the pulley support assembly consisting of the hanger member and the yoke member 20. Accordingly, the relative upward movement of the tension indicator body 28 in the hanger member 22 provides an indication of the load carried by the spring 30 and also an accurate indication of the tension applied to the saw band 10. To indicate when the tension rod 26 has been lifted a sufficient distance in response to the rotation of the adjustment handle 32 there are provided cooperative indicating marks on the tension indicator body 28 and on the hanger member 22. Thus, the front of the skirt 74 of the hanger member is provided with an opening 120 shown particularly in Figure 5, and through which a portion of the tension indicator body 28 is visible. At both sides of the opening 120, there are indicator pointers 122. As noted hereinabove the indicator body 28 is formed with an annular marking groove 82 that extends horizontally relative to the opening 120. This arrangement permits a simple procedure for applying proper tension to the saw band 10. Assuming that the saw band 10 is in place around the upper pulley 12 and also around the lower pulley, with the adjustment handle 32 in its horizontal position of Figure 1, the operator merely rotates this handle whereby the tension rod 26 will be caused to move upwardly through the bore 94 of the nut element 92. The tighter the saw band 10 is stretched the more taut the spring 30 will be compressed. This procedure is the same regardless of whether the saw band is undersized or oversized. No filler pieces or cam adjustments are required and instead the entire adjusting operation consists merely in rotation of the adjustment handle 32 so as to control the elevation of the tension rod relative to the housing 11. When the annular groove 82 of the tension indicator body 28 is in horizontal alignment with the pointers 122 of the opening 120 as shown in Figure 5, the proper degree of tension has been applied to the saw band 10.

In order to insure that the saw band 10 will track on the center of the saw band receiving flange 126 of the upper pulley 12, the round point adjusting screw 54 is advanced or retracted relative to the rear wall 16 of the upper pulley housing 11.

Figure 2:
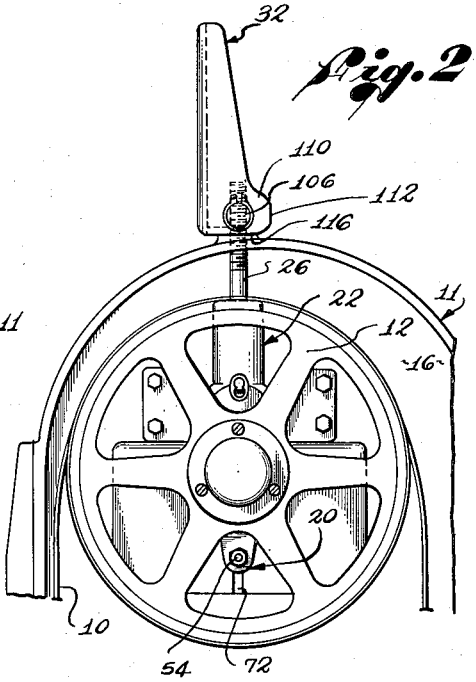
Figure 2 is a side elevational view similar to Figure 1, but showing the parts thereof arranged in position for removing the saw band.
Figure 4:
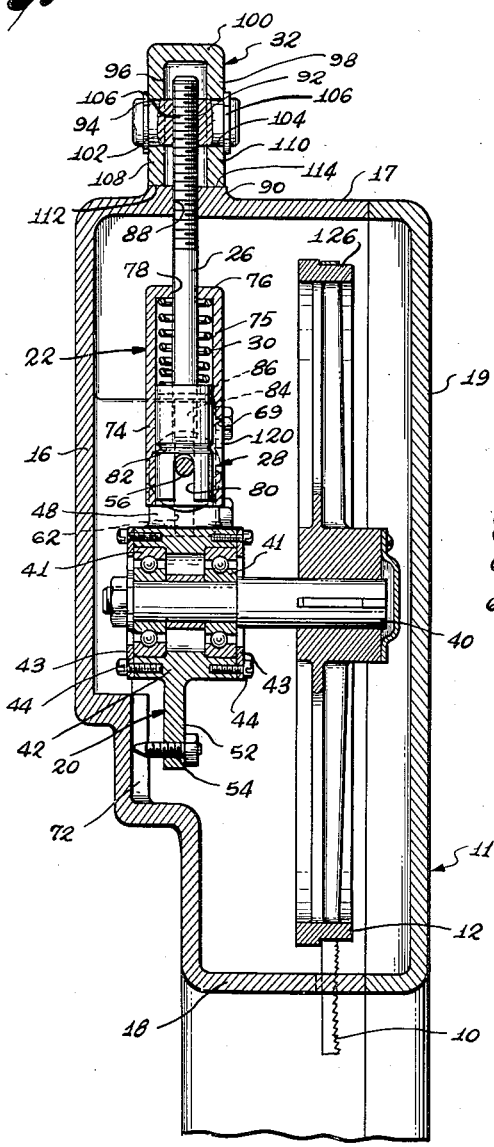
Figure 4 is a vertical sectional view taken along line 4—4 of Figure 3.

When it becomes necessary or desirable to remove the saw band 10 from tthe upper and lower pulleys of the meat cutting machine, it is only necessary to pivot the adjustment handle 32 in a counter-clockwise direction from its position of Figures 1, 3 and 4 to its upstanding position of Figure 2. Such movement of the adjustment handle will serve to lower the tension rod 26 relative to the upper pulley housing 11. This is true because the distance from the horizontal center of the nut element 92 to the flat surface 112 of the adjustment handle is greater than the distance from the center of the nut element to the flat surface 116. If the saw band 10 has been removed from its pulleys for the purpose of cleaning, when the saw band is again replaced on the pulleys it will automatically be stretched to its original tension when the adjustment handle 32 is returned from its position of Figure 2 to its position of Figure 1.

While there has been shown and described herein what is presently considered to be a preferred embodiment of the present invention, it will be apparent that various changes and modifications may be made thereto without departing from the spirit of the invention or the scope of the following claim.

I claim:

In a meat cutting machine having a housing wherein is disposed a band saw receiving-pulley, a mounting for said band saw that comprises: a support assembly for said pulley including a horizontal shaft keyed to said pulley; guide means in said housing supporting said assembly for vertical movement relative to said housing; tension indicating means including a body and a threaded tension rod extending upwardly from said body; cooperative tension indicating marks interposed between said support assembly and said body; resilient means interposed between said support assembly and said tension indicating means and yieldingly resisting downward movement of said support assembly relative to said tension indicating means; and an elongated adjustment handle having side walls which rotatably support at the front portion of said handle a horizontal nut element which is threadedly engaged with the upper portion of said tension rod, the side walls of said handle below said nut element being formed with depending arcuate cam surfaces having first flat surfaces that rest upon an upwardly-facing surface of said housing when said handle is disposed horizontally, and the front edge of said handle being formed with a second flat surface that rests upon said upwardly-facing surface when said handle is pivoted out of the horizontal, the distance between said nut element and said first flat surfaces being greater than the distance between said nut element and said second flat surfaces.

References Cited in the file of this patent

UNITED STATES PATENTS

| | | |
|---|---|---|
| 762,095 | Seymour | June 7, 1904 |
| 2,101,343 | Ponton | Dec. 7, 1937 |
| 2,380,700 | Lasar | July 31, 1945 |

FOREIGN PATENTS

| | | |
|---|---|---|
| 31,619 | Switzerland | Oct. 17, 1904 |